C. F. FORD.
BALL BEARING LOCKING DEVICE.
APPLICATION FILED APR. 15, 1920.

1,380,708.

Patented June 7, 1921.
2 SHEETS—SHEET 1.

Inventor:
Charles Frederick Ford

C. F. FORD.
BALL BEARING LOCKING DEVICE.
APPLICATION FILED APR. 15, 1920.
1,380,708.
Patented June 7, 1921.
2 SHEETS—SHEET 2.
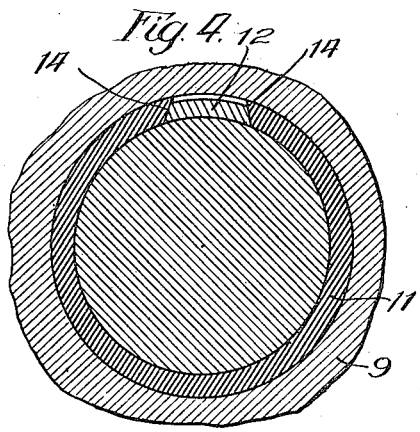
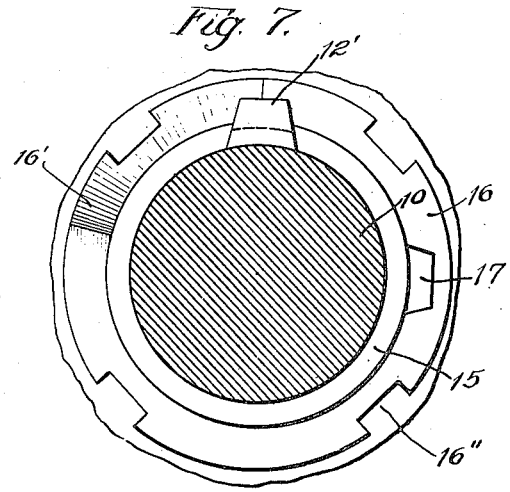
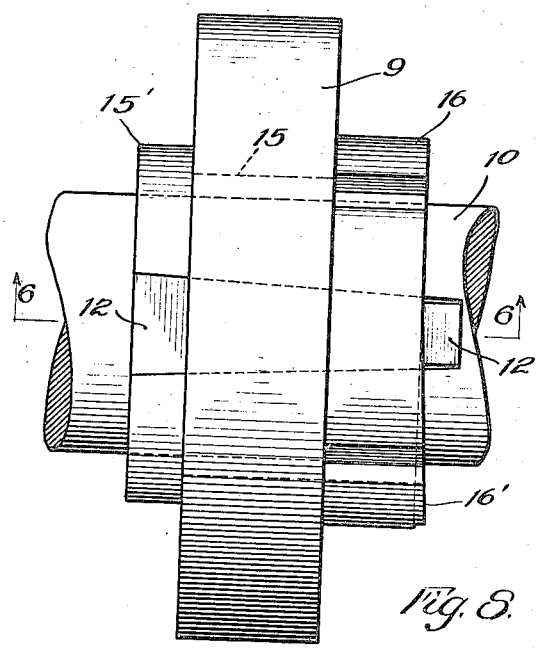
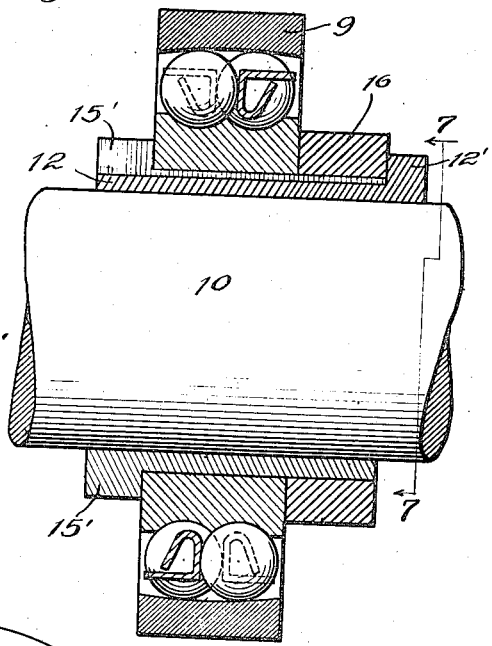
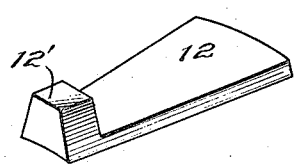
Inventor:
Charles Frederick Ford
By
Atty.

UNITED STATES PATENT OFFICE.

CHARLES FREDERICK FORD, OF CHICAGO, ILLINOIS.

BALL-BEARING-LOCKING DEVICE.

1,380,708.    Specification of Letters Patent.    Patented June 7, 1921.

Application filed April 15, 1920. Serial No. 374,161.

*To all whom it may concern:*

Be it known that I, CHARLES FREDERICK FORD, a citizen of the United States, residing at Chicago, in the county of Cook and State of Illinois, have invented certain new and useful Improvements in Ball-Bearing-Locking Devices, of which the following is a specification.

The object of this invention is to provide simple means comprising few parts adapted to be easily applied for securely and rigidly locking a straight bored bearing on a shaft so that it will not work loose from the shaft in service.

In the accompanying drawings I have illustrated two embodiments of the invention which I have found in actual practice to be entirely satisfactory, and referring thereto.

Fig. 4 is a sectional view on the line 4—4 of Fig. 3;

Fig. 5 is an elevation illustrating another embodiment of the invention;

Fig. 6 is a sectional view on the line 6—6 of Fig. 5;

Fig. 7 is a sectional view on the line 7—7 of Fig. 6;

Fig. 8 is a perspective view of the wedge key.

Figure 1:
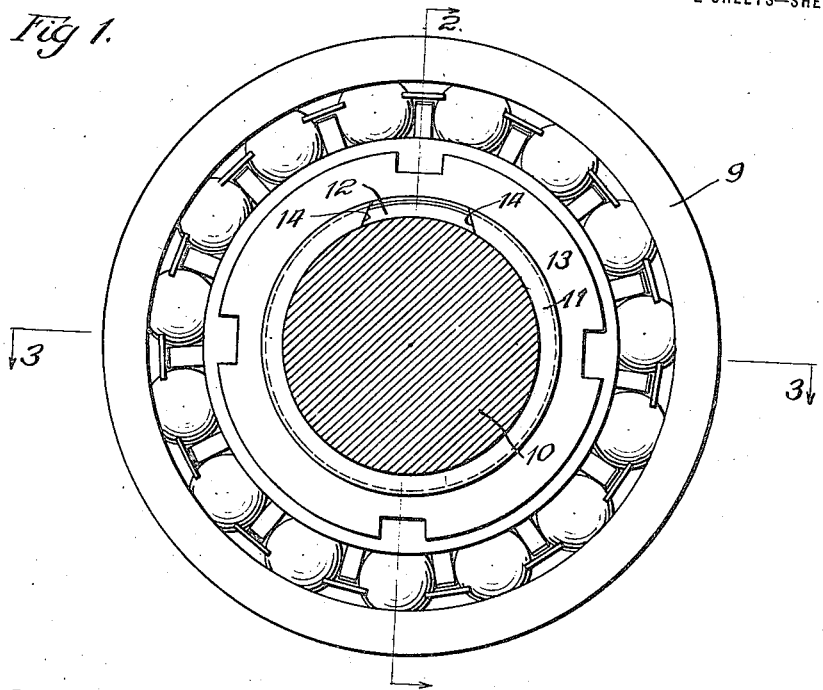
Figure 1 is an elevation of a well-known type of ball bearing having my invention embodied therewith in one form, the shaft being shown in section.
Figure 2:
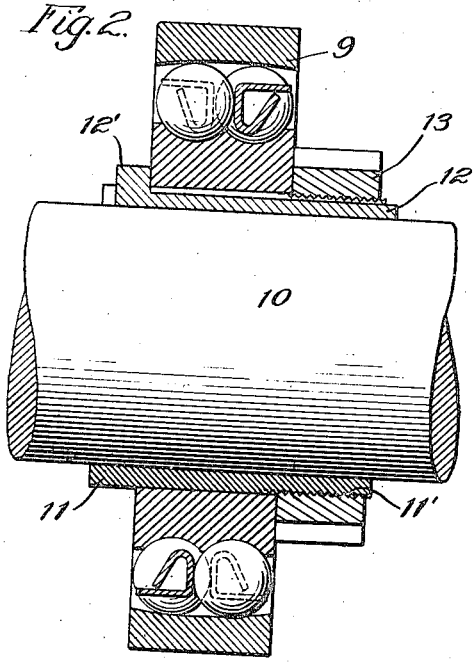
Fig. 2 is a sectional view on the line 2—2 of Fig. 1.
Figure 3:
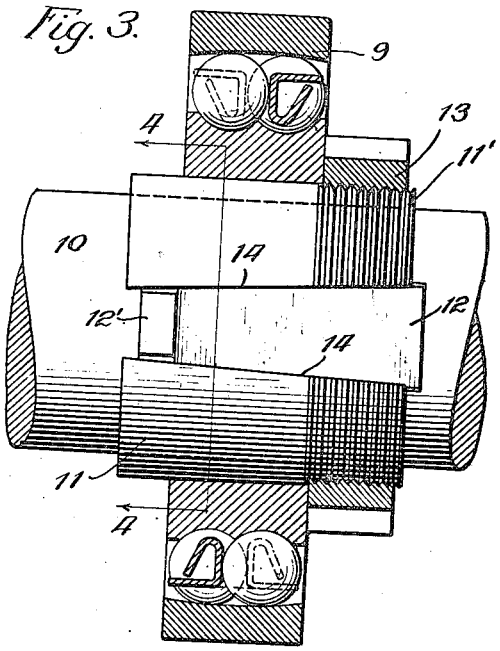
Fig. 3 is a sectional view on the line 3—3 of Fig. 1.

Referring to that form of the invention illustrated in Figs. 1-4, 9 is the bearing, 10 the shaft, 11 the sleeve, 12 the wedge key and 13 the locking collar.

I have selected for illustrating the invention a well-known type of ball bearing but I do not restrict myself to this particular bearing and desire to have it understood that the invention may be employed satisfactorily with other bearings.

The sleeve has a straight bore to fit the shaft and it is threaded at one end 11'. A wedge shape section is cut out of the sleeve to accommodate the wedge key 12 and the edges 14 of the sleeve and key are beveled, as shown in Fig. 4, so that the key is wedge shape transversely as well as longitudinally. The key is somewhat thinner than the sleeve so that the collar may be adjusted on the threaded end of the sleeve without engaging the key. The key is curved to conform substantially with the curvature of the shaft and sleeve and it is provided at its smaller end with an outstanding lug 12'.

In practice the sleeve and the key are assembled on the shaft and the bearing is arranged in place thereon. Then the collar is screwed on the threaded end of the sleeve against the bearing. By reference to Figs. 2 and 3 it will be readily understood that as the collar is tightened on the sleeve against the bearing the latter will be forced against the lug 12' of the key and pull the wedge farther into the sleeve. As the wedge is thus moved lengthwise in the wedge space of the sleeve it is also moved inwardly against the shaft by reason of the bevel engaging edges of the key and sleeve to bite into the shaft and thus securely lock the bearing on the shaft. This wedge action of the key in the sleeve may to a slight extent loosen the engagement of the sleeve on the shaft adjacent the wedge space but the sleeve will be tightened on the shaft throughout the rest of its surface, so that the bearing is locked and bound to the shaft not only by the wedge key but also by the sleeve. This locking, binding, of the bearing on the shaft is increased as the collar is tightened on the sleeve because the collar pushes against the bearing, the bearing pushes against the lug on the wedge key and pulls the wedge farther into the wedge space of the sleeve, thereby causing the wedge to bind against the shaft and bite into the shaft at its edges and at the same time tend to expand the sleeve at the wedge space and thereby cause the sleeve opposite the wedge space to more tightly bind the shaft.

In the construction of Figs. 5-7, the sleeve 15 is cut away to provide space for the wedge key 12 which has the upstanding lug 12' as before described. In this construction, however, I dispense with the thread on the sleeve and provide it with a flange 15'.

The collar 16 has a cam 16' on one end to engage the lug 12' of the key, and it is also provided with recesses 16'' to receive a spanner wrench. In this construction the parts are assembled on the shaft with the bearing located on the sleeve and key between the flange 15' and the collar 16, with the lug 12' of the key engaging the outer end of the collar which bears the cam 16'. The collar is adjusted rotatively on the sleeve and wedge by the application of a spanner wrench, or any other suitable means, and the cam is thereby caused to travel in engagement with the lug 12', the effect of which is to push the collar against the bearing and the bearing against the flange 15' and at the same time pull the wedge key lengthwise farther into the wedge space. The effect of this action is the same as that heretofore described, the wedge is caused to bind more tightly upon the shaft and by spreading the bevel edges of the sleeve the latter is also caused to bind more tightly upon the shaft throughout the greater portion of its engaging area. An opening 17 is provided in the collar 16 to accommodate the lug 12' and enable the parts to be readily assembled.

My invention is very simple in construction, it comprises only a few parts, it can be very easily applied to securely and tightly and rigidly lock a bearing on a shaft. A right thread should be provided for a left rotating shaft, and a left thread for a right rotating shaft, in the form of Figs. 1-4, and the cam 16' in the form of Figs. 5-7 should be correspondingly pitched so that the rotation of the shaft and bearing will have a tendency to tighten the locking device rather than to loosen it in service.

My ball bearing locking device may be used for loose pulleys, clutches, hangers, etc., and in connection with any kind of bearings to which it may be adapted.

I am aware that my invention may be made in different sizes, proportions, and with variations in the parts and details from those herein shown and described and for this reason I do not limit myself to the particular construction and proportion and arrangement of parts herein shown and described but reserve the right to make all such changes as fairly fall within the scope of the following claims.

I claim:

1. A ball bearing locking device comprising, in combination, a shaft, a sleeve on the shaft divided by a wedge space, a wedge key in said wedge space, a bearing mounted on the sleeve and wedge, and a collar on the sleeve and key adapted to be tightened against the bearing to tighten the key in the wedge space and lock the bearing on the shaft.

2. A ball bearing locking device comprising, in combination, a shaft, a sleeve on the shaft divided by a wedge space, a wedge key in said wedge space, a bearing on the sleeve and wedge, and a collar on the sleeve and key adapted to be adjusted to move the key lengthwise in the wedge space and relatively to the sleeve to lock the bearing on the shaft.

3. A ball bearing locking device comprising, in combination, a shaft, a sleeve on the shaft divided by a wedge space, a wedge key in said wedge space, a bearing mounted on the sleeve and wedge, and a collar on the sleeve adapted to be adjusted to move the key transversely relative to the sleeve to lock the bearing on the shaft.

4. A ball bearing locking device comprising, in combination, a shaft, a sleeve on the shaft divided by a wedge space, a wedge key in said wedge space, a bearing mounted on the sleeve and wedge, and a collar on the sleeve and key adapted to be adjusted to move the key lengthwise and transversely relative to the sleeve to lock the bearing on the shaft.

5. A ball bearing locking device comprising, in combination, a shaft, a sleeve on the shaft divided by a wedge space, a wedge key in said wedge space, the engaging edges of said key and sleeve being beveled, a bearing mounted on the sleeve and wedge, and a collar on the sleeve and key adapted to be adjusted to lock the bearing on the shaft.

6. A ball bearing locking device comprising, in combination, a shaft, a sleeve on the shaft divided by a wedge space having converging edges, said edges being beveled, a wedge key to engage said space and having converging bevel side edges, a bearing mounted on the sleeve and wedge, and a collar adapted to be adjusted lengthwise of the sleeve and wedge and against the bearing to tighten the key in the wedge space and lock the bearing on the shaft.

7. A ball bearing locking device comprising, in combination, a shaft, a sleeve on the shaft divided by a wedge space and having a threaded end portion, a wedge key in said wedge space and having an outstanding lug at one end thereof, a bearing mounted on the sleeve and wedge, and a collar threadedly engaging the threaded portion of the sleeve and adapted to be tightened against the bearing to tighten the key in the wedge space and lock the bearing on the shaft.

8. A ball bearing locking device comprising, in combination, a shaft, a sleeve on the shaft divided by a wedge space, a wedge key in said wedge space having an outstanding lug at its smaller end, a bearing mounted on the sleeve and wedge with one side thereof in engagement with the lug, and a collar adjustably mounted on the sleeve to engage the other side of the bearing and tighten the key in the wedge space and lock the bearing on the shaft.

9. A ball bearing locking device comprising, in combination, a shaft, a sleeve on the shaft divided by a wedge space and having a threaded end portion, a wedge key arranged in said wedge space and having its outer face below the plane of the threads on the sleeve, a lug on the smaller end of the wedge key, a bearing mounted on the sleeve and wedge with one side thereof in engagement with the lug, and a collar engaging the threaded portion of the sleeve and adapted to be tightened against the other side of the bearing to tighten the key in the wedge space and locking the bearing on the shaft.

CHARLES FREDERICK FORD.